Aug. 18, 1970 A. SCHMITZ 3,525,020

INTEGRATED CIRCUIT ARRANGEMENT HAVING GROUPS OF CROSSING CONNECTIONS

Filed May 15, 1967 2 Sheets-Sheet 1

INVENTOR.
ALBERT SCHMITZ
BY
[signature]
AGENT

INVENTOR.
ALBERT SCHMITZ
BY
Frank R. Trifari
AGENT 3,525,020

INTEGRATED CIRCUIT ARRANGEMENT HAVING GROUPS OF CROSSING CONNECTIONS

Albert Schmitz, Emmasingel, Eindhoven, Netherlands, assignor, by mesne assignments, to U.S. Philips Corporation, New York, N.Y., a corporation of Delaware Filed May 15, 1967, Ser. No. 638,339
Claims priority, application Netherlands, May 19, 1966, 6606912
Int. Cl. H01l *19/00*
U.S. Cl. 317—101 8 Claims

ABSTRACT OF THE DISCLOSURE

A semiconductor matrix is constructed with two groups of crossing conductors on one side of a semiconductor wafer, the second group of conductors being continuous through the use of uninterrupted conducting surface regions. The conductors interconnect circuit elements of different nature such as diodes, transistors, capacitors, pnpn-devices etc.

Figure 1:
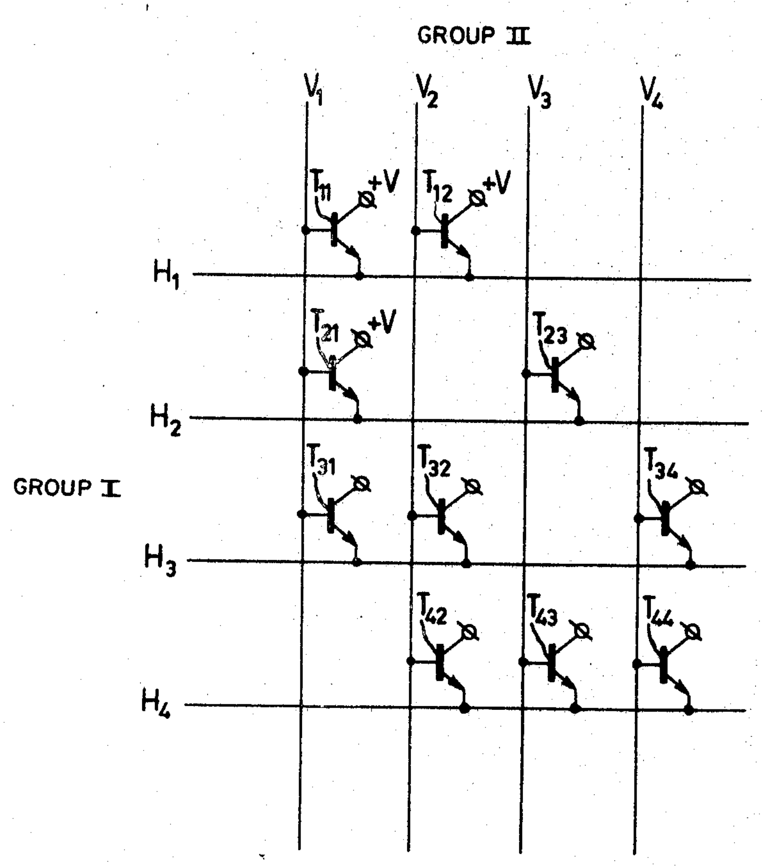

The invention relates to a semi-conductor comprising a semiconductor body provided at least on one side with an insulating layer, for example, of silica, on which side are provided two crossing groups each consisting of a large number of substantially parallel strip-shaped connections, one group consisting of continuous metal layers applied to the insulating layer, whilst at a crossing, a connection of the second group consists of a conducting and preferably diffused surface zone of one conductivity type which is located below the insulating layer and is surrounded in the semiconductor body by a region of the other conductivity type, the body also including on this side a number of circuit elements which are connected, at least at a number of the crossings, to both crossing connections.

Semiconductor devices of the abovementioned kind are of common knowledge as integrated circuits in semiconductor technology and constitute inter alia stationary storages or cross-bar systems.

Circuit elements are to include herein not only separate elements such as transistors, diodes etc., but also, for example, bistable elements which individually are composed of a number of separate elements such as flip-flop circuits etc.

In practice, it was intended hitherto to use for both crossing connections metal layers which have the advantage of an extremely low electric resistance between the cross-points. Attempts have been made to prevent short-circuits by separating these crossing metal layers from each other at the cross-points by means of insulating layers, but this is found to involve great difficulty in practice.

Therefore, in practice, the crossings have invariably been constructed so that one group consists of continuous metal layers applied to the insulating layer. A connection of the second group then also consists of a metal layer which, however, is interrupted at a crossing and joins a diffused surface zone lying below the insulating layer and being insulated from the remaining part of the semiconductor body by means of one or more p-n junctions. Consequently the second group of connections, mainly consists of metal layers only with the difference that they are interrupted only in the proximity of the crossings and pass through diffused zones in the semiconductor body only applied at these areas.

The invention has for an object to provide a semiconductor device of the kind described in the preamble which can be manufactured in a simpler manner and may have advantageous electrical properties.

According to the invention, a semiconductor device of the kind described in the preamble is characterized in that the connections of the second group also include between the crossings a preferably diffused surface zone of one conductivity type surrounded in the semiconductor body by a region of the other conductivity type, as a result of which each connection of the second group includes a continuous surface zone which is crossed by the connections of the first group. Also in embodiments in which a connection of the second group comprises a metal layer which is interrupted at the crossings and joins at these crossings a conducting and preferably diffused surface zone of one conductivity type which lies below the insulating layer and passes below the crossing connection of the first group and which is surrounded in the semiconductor body by a region of the other conductivity type, according to the invention, the preferably diffused zones also pass at the crossings below the interrupted metal layer, and thus constitute one continuous preferably diffused zone, though this step seems to be superfluous owing to the presence of the more satisfactorily conducting metal layer, the interrupted metal layer lying through the major part of the length of a diffused zone between two crossings and through the major part of the width of this zone on the said zone. The manufacturing process has the advantage that the mask by means of which the diffused surface zones are obtained can be more readily produced, since in this case, instead of islands, a continuous zone is diffused, while moreover, the application to the correct area of the metal layer associated with the relevant connection, a short-circuit of which the crossing connection must be prevented, becomes less critical. Furthermore, in those cases in which the groups of conducting connections and the circuit elements are applied by means of separate masks, the advantage is obtained that a larger tolerance is permissible in the application of the relevant mask in the direction of the diffused strips.

The invention is of particular importance in those cases in which the distance between adjacent connections of the first group is not excessively large. In these cases, according to the invention, the total circumference of the surface zones can be considerably reduced as compared with known constructions. Since the surface leakage current across the non-conducting p-n junctions constituted by the surface zones with the subjacent semiconductor body is substantially proportional to the said total circumference, this leakage current can thus be considerably reduced. This becomes more important accordingly as the number of crossings is larger.

In known constructions, the usual diffused islands generally extend through a distance lying between approximately once and twice their width beyond the crossing conductor applied to the insulating layer. In practice, this is desirable in order to prevent shortcircuit between the crossing connections and to ensure that there is sufficient room to establish contact with the joining metal layer applied to the insulating layer.

Therefore, an important preferred embodiment of the invention is characterized in that the distance between adjacent connections of the first group is at the most five times and preferably at the most three times the width of the conducting surface zone. In this case, the total circumference of the diffused zones and hence the surface leakage current are effectively reduced in practice.

As already stated, the diffused surface zone is surrounded in the semiconductor body by a region of the other conductivity type, and in operation, the p-n junction thus formed is biassed in the cut-off direction in order to obtain a satisfactory insulation. In order to ensure that under any conditions the surface zones are insulated from the subjacent semiconductor body, however, it is often of advantage in practice that the surface zone is surrounded in the semiconductor body by a second preferably diffused zone of the other conductivity type provided in a part of the semiconductor body of one conductivity type. In this case, the surface zone, the second zone and the subjacent semiconductor body constitute a pnp- or npn-structure, and in operation invariably one of the two series-connected p-n junctions is cut off for any leakage currents.

The diffused surface zones associated with the second group of connections may be applied by a separate diffusion process. The concentration of the diffusing impurity will be chosen in practice to be at a maximum in order to obtain an optimally conducting connection. If the semiconductor device includes circuit elements of a transistor configuration, it is of advantage to apply the surface zone simultaneously with the emitter zone of a transistor configuration which generally has a high concentration of donors or acceptors.

A further preferred embodiment of the invention is characterized in that the device includes circuit elements of a transistor configuration and in that the thickness, conductivity type and conduction of the surface zone correspond to those of the emitter zone of at least one of the transistor configurations.

The abovementioned case, in which the diffused surface in the body is surrounded by a second diffused zone of the other conductivity type, is of particular importance. According to another preferred embodiment, the thickness, conductivity type and conduction of the surface zone and of the second zone correspond to those of the emitter zone and the base zone, respectively, of at least one of the transistor configurations.

If in embodiments of the semiconductor device in which the surface zone is surrounded by a second diffused zone, during operation of the circuit arrangement, one of the two p-n junctions constituted by the surface zone, the second zone and the semiconductor body is constantly biassed in the cut-off direction, it is desirable for the other p-n junction to be shortcircuited in order to counteract leakage currents which may be amplified by the transistor effect of the configuration constituted by the surface zone, the second zone and the semiconductor body.

According to a preferred embodiment, the p-n junction between the second zone and the subjacent part of the semiconductor body of at least one connection of the second group is practically shortcircuited and, according to a further preferred embodiment, the p-n junction between the surface zone and the second zone of at least one connection of the second group is practically shortcircuited.

Although, as stated, the connections of the second group generally have metal layers joining the diffused zones, in certain conditions, these metal layers may also be omitted, for example in those cases in which connections of the second group convey only small currents such as the base current of a transistor, while a slightly higher resistivity of the conducting connections, occurring, for example, in diffused strips, is admissible.

Though the above description is substantially solely concerned with a diffused surface zone, it will be appreciated that in configurations which already have local good conducting surface zones not obtained by diffusion, for example, in the form of an epitaxially applied layer, this layer may also be used as a surface zone in accordance with the invention.

Figure 2:
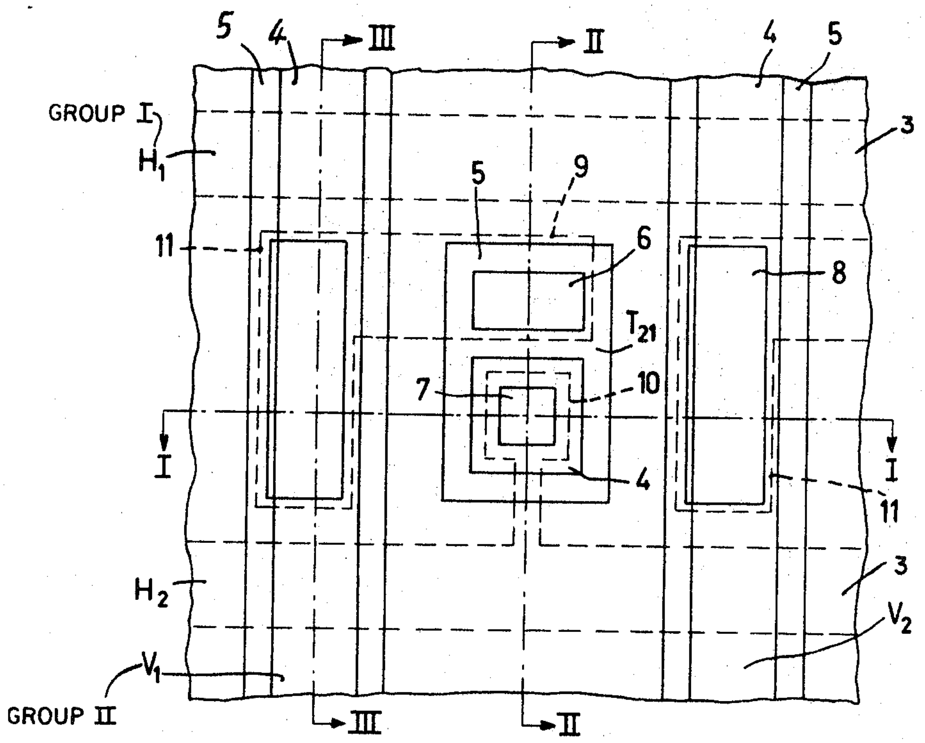

The invention will now be described more fully with reference to an example and to the drawing, in which:

FIG. 1 shows the circuit diagram of an integrated storage circuit manufactured by the use of the invention, FIG. 2 shows a transistor configuration at a crosspoint of the circuit arrangement of FIG. 1, FIGS. 3, 4 and 5 are cross-sectional views of the transistor configuration of FIG. 2 taken on the lines I—I, II—II and III—III, respectively.

FIG. 1 shows the circuit diagram of a storage matrix including two groups of conductors $V_1$–$V_4$ and $H_1$–$H_4$. At given cross-points, conductors of different groups are coupled with each other by transistors $T_{11}$, $T_{12}$ etc., the base electrodes being connected to the conductors $V_1$–$V_4$ and the emitters to the conductors $H_1$–$H_4$, whilst the collectors are connected to each other and to a voltage source +V. For example, the conductor $V_1$ is coupled with the conductors $H_1$, $H_2$ and $H_3$ through transistors $T_{11}$, $T_{21}$ and $T_{31}$; the conductor $V_2$ to the conductors $H_1$, $H_3$ and $H_4$ through transistors $T_{12}$, $T_{32}$ and $T_{42}$ etc.

This matrix operates as follows. When a positive pulse is applied to one of the conductors $V_1$–$V_4$ acting as input conductors, for example, conductor $V_2$, the transistors connected to the said conductors, in this case $T_{12}$, $T_{32}$ and $T_{42}$, will become conducting, a pulse being passed to the output conductors $H_1$, $H_3$ and $H_4$. Owing to the current amplification in the transistors, the collector currents applied to the conductors $H_1$–$H_4$ will be larger than the base currents so that a comparatively small quantity of control energy at the conductors $V_1$–$V_4$ is sufficient.

Depending upon the chosen coupling pattern, the given code combinations of output pulses will be produced when a pulse is applied to an input conductor.

In practice, the number of conductors of the two groups will be larger, for example, ten for each group, whilst it is of course not necessary for the number of input conductors to be equal to the number of output conductors.

FIGS. 2 to 5 illustrate the manner in which such a circuit arrangement can be integrated when the invention is used. Only the part including the transistor $T_{21}$ and the conductors $H_1$, $H_2$, $V_1$ and $V_2$ is shown. The boundaries of diffused regions and of windows in the insulating layer are indicated by full lines and the boundaries of the metal layers applied thereto are indicated by broken lines.

FIG. 2 shows part of a semiconductor body consisting of an n-type conducting silicon plate 1 (cf. FIG. 3) the upper side of which is coated with an insulating layer 2 of silica. Moreover, two crossing groups each consisting of a large number of substantially parallel strip-shaped electrically conducting connections $H_1$, $H_2$ etc. and $V_1$, $V_2$ etc., respectively, are applied to the upper side of the plate. Only two connections of each group are shown. One group ($H_1$, $H_2$ etc.) consists of continuous metal layers 3 (cf. FIGS. 3 to 5) applied to the insulating layer 2, whilst at a crossing (for example $H_2$, $V_1$) the connection $V_1$ of the second group is established (cf. FIG. 5) by means of a diffused n-type conducting surface zone 4 which lies below the insulating layer 2 and is surrounded in the semiconductor body by a region 5 of the other (p-) conductivity type. The connections $V_1$, $V_2$ etc. also include a metal layer 11 which is interrupted at the crossings and which lies through the major part of the length of a diffused zone 4 between two crossings and through the major part of the width of this zone on the zone 4. Furthermore, a number of transistors (e.g. $T_{21}$) is provided by diffusion in the body on the same side of the semiconductor plate. At the crossings shown (cf. FIG. 2) the base contact 9 (cf. FIG. 4) of the transistor $T_{21}$ is connected to the conductor $V_1$, and the emitter contact 10 is connected to the conductor $H_2$. The conductor $V_1$ of the second group also has between the crossing $H_1V_1$ and $H_2V_2$ a continuous diffused n-type conducting surface zone 4 surrounded by a p-type conducting region 5.

The diffused connections V and the transistors are applied by the resist and diffusion techniques commonly used in semiconductor technology. First a layer of silica is applied by oxidation to the semiconductor plate 1, which silica layer is then provided with apertures by the use of known photoresist techniques. When the plate is subsequently subjected to a p-type diffusion treatment, for example, of boron, as shown in FIGS. 2 to 5, a p-type conducting layer 5 having a layer resistance of approximately 180Ω/square is diffused through a depth of approximately 3μ. This layer constitutes not only the regions 5 associated with the connections V, but also the base zone of transistor $T_{21}$.

Subsequently, windows are etched again in the oxide layer, uninterrupted again during this p-type diffusion, at the areas at which the n-type conducting layer 4 must be applied. This layer is applied by diffusion, for example, of phosphorous and, like in the preceding diffusion of the layer 5, the silica serves as a mask. This layer 4 has a layer resistance of approximately 1.5Ω/square and a depth of approximately 2μ and it constitutes both the surface zones 4 associated with the connections V and the emitter of transistor $T_{21}$.

Finally, the windows 6, 7 and 8 are etched in the oxide layer.

A metal layer 3 is now applied to the configuration thus obtained, for example, by vapour deposition of an aluminum layer having a thickness of 5000 A. In the windows 6, 7 and 8, this layer establishes an ohmic contact with the subjacent semiconductor regions. The layer 3 is then locally removed by etching so that only the conductors H, the base contacts 9, the emitter contacts 10 and the strips 11 are left.

The masks or mask parts used in this technique for the application of the diffused zones $V_1$, $V_2$ etc. can be readily manufactured and only include strip-shaped regions, which is contrary to the usual technique which, as already described, is based on the use of diffused islands. Furthermore, the application of the metal layer 11 (FIGS. 2 and 5) which is coherent with the base contact 9 and through which the said base contact is connected to the conductor $V_1$, is less critical than if the said metal layer would have to be connected between islands having limited dimensions in the direction of $V_1$.

In the present example, the distance between the adjacent connections $H_1$ and $H_2$ of the first group is approximately four times the width of the conducting surface zones 4 associated with the conductors $V_1$ and $V_2$ of the second group. As stated, the circumference of the surface zones is reduced as compared with the known island configuration. In circuit arrangements in which the distance between the conductors H is even smaller and preferably smaller than thrice the width of the surface zones, this effect is enhanced.

Figure 3:
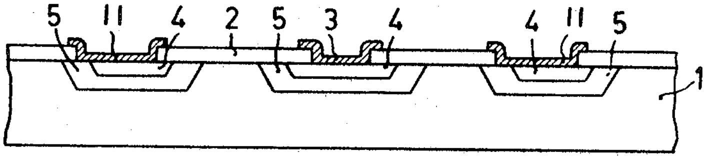
Figure 4:
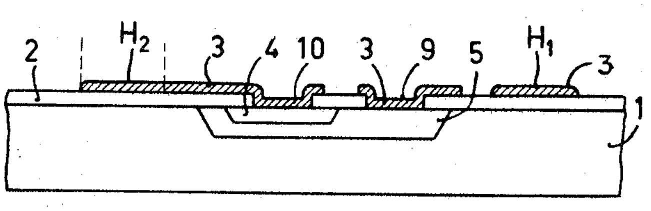
Figure 5:
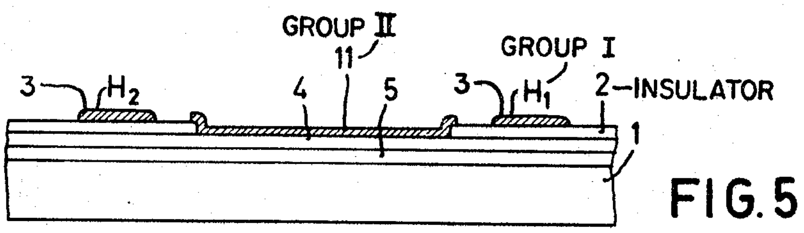

It is apparent from FIG. 3 that, as stated above, the p-n junction between the conducting surface zone 4 and the second zone 5 is practically short circuited at the crossings in order to reduce leakage currents. In other circuit arrangements, it could be advantageous if, depending upon the polarity and the value of the operating voltages at the p-n junctions, the p-n junction between the layer 5 and the subjacent body 1 should locally be short-circuited.

Although in this example, the diffused zones constituting the connections $V_1$, $V_2$ etc. are applied simultaneously with the base and emitter zones of the transistors, under certain conditions, these zones may alternatively be applied by separate diffusion treatments. If desired, where the conductors V are applied, the layer 4 may be omitted, but in this case, the doping of the p-type conducting layer 5 must be considerably stronger than that of the base of the transistor in order that a sufficient conductivity is ensured.

Furthermore, it will be appreciated that the invention is not limited to the example described, but that many modifications are possible without departing from the scope of the invention. For example, especially the semiconductor materials, insulating layers and metals mentioned may be varied within wide limits. Furthermore, besides transistors, the circuit elements used may be diodes, resistors and elements individually composed of a number of separate transistor configurations, diodes, resistors etc. Under certain conditions, instead of diffused zones, other good conducting zones of the semiconductor body may be used, which may be applied epitaxially, whilst, as stated, in given cases, when the conductors V convey only small currents the interrupted metal layers 11 may be omitted.

What is claimed is:

1. A semiconductor device comprising a semiconductor body having a surface, an insulating layer on said body surface, first and second groups of substantially parallel elongated strip-shaped conducting connections forming plural crossings, said first group comprising a plurality of elongated continuous metal strips on said insulating layer, said second group comprising a plurality of elongated continuous conducting surface zones of said body of one conductivity type and situated below and adjacent said insulating layer and surrounded within the body by a region of the opposite conductivity type forming at least one isolating p-n junction extending to the surface, said second group further comprising a plurality of surface metal layers each on and in contact with the major part of the length and width of each of said one type surface zones between the said crossings and being interrupted at said crossings, a plurality of circuit elements in the body adjacent the said body surface and between said crossings, and means connecting a circuit element to a connection of said first and second groups at at least a plurality of the crossings.

2. A device as set forth in claim 1 wherein the spacing between adjacent connections of the first group is at most five times the width of the said surface zones of the second group.

3. A semiconductor device as claimed in claim 1 wherein the said surface zone is a diffused zone and surrounded in the semiconductor body by a second diffused zone of the opposite conductivity type which is provided in a part of the one conductivity type of the semiconductor body, said second diffused zone forming with the said part a second p-n junction.

4. A semiconductor device as claimed in claim 1 wherein said circuit elements are transistors having emitter and base zones, the thickness, conductivity type and conductivity of the said surface zone being the same for the emitter zones of the transistors.

5. A semiconductor device as claimed in claim 3 wherein the thickness, conductivity type and conductivity of the said surface zone and the said second zone correspond to that of the emitter zone and the base zone, respectively, of the transistors.

6. A semiconductor device as claimed in claim 3 and including means for short-circuiting the second p-n junction formed between the second zone and the subjacent part of the semiconductor body in at least one connection of the second group.

7. A semiconductor device as claimed in claim 3 and including means for short-circuiting the p-n junction formed between the surface zone and the second zone in at least one connection of the second group.

8. A semiconductor device as set forth in claim 1 wherein the circuit elements are transistors having diffused emitter and base zones forming transistor junctions in the body between the crossing connections, the area of contact of the surface metal layers on the surface zones exceeding the area of each of the transistor junctions.

References Cited

UNITED STATES PATENTS

| | | | |
|---|---|---|---|
| 3,212,613 | 11/1965 | Gribble et al. | |
| 3,312,871 | 4/1967 | Seki et al. | |
| 3,312,882 | 4/1967 | Pollock | 317—235 |
| 3,402,330 | 9/1968 | Archer | 317—235 |
| 3,448,344 | 6/1969 | Schuster et al. | |

HERMAN O. JONES, Primary Examiner

D. SMITH, JR., Assistant Examiner

U.S. Cl. X.R.

29—576; 317—231